United States Patent
Richardson et al.

(10) Patent No.: US 11,822,312 B2
(45) Date of Patent: *Nov. 21, 2023

(54) SYSTEM AND METHOD FOR THREE-DIMENSIONAL (3D) COMPUTER-AIDED MANUFACTURING (CAM) OF AN ENSEMBLE OF PILOT EQUIPMENT AND GARMENTS

(71) Applicant: LOCKHEED MARTIN CORPORATION, Bethesda, MD (US)

(72) Inventors: Matthew S. Richardson, Fort Worth, TX (US); Michael W. Hale, Orlando, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,732

(22) Filed: Aug. 16, 2022

(65) Prior Publication Data
US 2022/0390921 A1 Dec. 8, 2022

Related U.S. Application Data

(63) Continuation of application No. 16/840,795, filed on Apr. 6, 2020, now Pat. No. 11,507,056.

(51) Int. Cl.
G05B 19/4099 (2006.01)
G06F 30/20 (2020.01)
(Continued)

(52) U.S. Cl.
CPC ........... *G05B 19/4099* (2013.01); *A41H 1/02* (2013.01); *B29C 64/393* (2017.08); *B33Y 80/00* (2014.12);
(Continued)

(58) Field of Classification Search
CPC ...... G05B 19/4099; G05B 2219/35012; G05B 2219/35051; G05B 2219/35134;
(Continued)

(56) References Cited

U.S. PATENT DOCUMENTS 3,910,269 A * 10/1975 Ansite .................... B64D 10/00
128/201.24
4,586,200 A 5/1986 Poon
(Continued)

FOREIGN PATENT DOCUMENTS

CA 2359513 C * 10/2012 ............... A41H 1/00
CN 103699736 A * 4/2014
(Continued)

OTHER PUBLICATIONS

"Industry Connections (IC) 3D Body Processing", IEEE SA Standards Association, (2020), https://standards.ieee.org/industry-connections/3d/bodyprocessing.html (6 pages).
(Continued)

*Primary Examiner* — Thomas C Lee
*Assistant Examiner* — Michael Tang
(74) *Attorney, Agent, or Firm* — Foley & Lardner LLP

(57) ABSTRACT

A system comprising a scanner to scan the airman or soldier (subject), a processor to receive, from the scanner, a non-manifold three-dimensional (3D) digital surface model (DSM) scan data representative of the subject, and a computer-aided manufacturing (CAM) device. The processor recognizes anatomical features on the 3D surface model including the cephalic (head) region of the scanned subject; stores each sub region defined by anatomical features as a non-manifold 3D surface model; creates a surface offset from the DSM sub region; creates a closed volume within and between the DSM sub region and the offset surface representative of a solid 3D pilot flight equipment; and
(Continued)

causes a computer-aided manufacturing (CAM) device to manufacture the solid 3D pilot flight equipment.

20 Claims, 14 Drawing Sheets

(51) Int. Cl.

| | | |
|---|---|---|
| G06T 17/00 | (2006.01) | |
| G06T 19/20 | (2011.01) | |
| A41H 1/02 | (2006.01) | |
| B33Y 80/00 | (2015.01) | |
| B29C 64/393 | (2017.01) | |
| G06V 40/10 | (2022.01) | |
| B29L 31/48 | (2006.01) | |

(52) U.S. Cl.
CPC .............. *G06F 30/20* (2020.01); *G06T 17/00* (2013.01); *G06T 19/20* (2013.01); *G06V 40/103* (2022.01); *B29L 2031/48* (2013.01); *G05B 2219/35012* (2013.01); *G05B 2219/35051* (2013.01); *G05B 2219/35134* (2013.01); *G05B 2219/49023* (2013.01)

(58) Field of Classification Search
CPC ............ G05B 2219/49023; A41H 1/02; B29C 64/393; B29C 64/386; B33Y 80/00; B33Y 50/00; G06F 30/20; G06T 17/00; G06T 19/20; G06V 40/103; B29L 2031/48
USPC ..... 700/182; 2/455, 410, 456, 411; 702/155, 702/156, 157, 158, 166, 167, 170
See application file for complete search history.

(56) References Cited

U.S. PATENT DOCUMENTS

| | | | |
|---|---|---|---|
| 4,831,668 A | 5/1989 | Schulz | |
| 5,452,516 A * | 9/1995 | Schegerin | B64D 10/00 356/139.03 |
| 5,584,073 A | 12/1996 | Radzelovage et al. | |
| 5,891,372 A | 4/1999 | Besset et al. | |
| 6,279,172 B1 | 8/2001 | Epperson et al. | |
| 6,925,350 B2 | 8/2005 | Watanabe | |
| 6,944,327 B1 | 9/2005 | Soatto | |
| 7,243,378 B2 | 7/2007 | Desarmaux et al. | |
| 7,982,750 B2 | 7/2011 | Xie | |
| 8,032,337 B2 | 10/2011 | Deichmann et al. | |
| 8,176,574 B2 | 5/2012 | Bryant et al. | |
| 8,457,772 B2 | 6/2013 | Giasson et al. | |
| 8,874,251 B2 | 10/2014 | Thornton | |
| 9,251,591 B2 | 2/2016 | Song et al. | |
| 9,265,414 B2 | 2/2016 | Wilson et al. | |
| 9,341,464 B2 | 5/2016 | Kimmel | |
| 9,418,503 B2 | 8/2016 | Williams et al. | |
| 9,420,260 B2 | 8/2016 | McGregor et al. | |
| 9,545,127 B1 | 1/2017 | Sandifer | |
| 10,031,350 B2 | 7/2018 | Fonte et al. | |
| 10,143,372 B1 | 12/2018 | Raynal et al. | |
| 10,159,296 B2 | 12/2018 | Pietrzak et al. | |
| 10,172,408 B1 | 1/2019 | Kelly | |
| 2002/0020004 A1 | 2/2002 | Beautz | |
| 2004/0163228 A1 | 8/2004 | Piorkowski et al. | |
| 2008/0060652 A1 | 3/2008 | Selvarajan et al. | |
| 2012/0305003 A1 | 12/2012 | Mark | |
| 2014/0201889 A1* | 7/2014 | Pietrzak | B33Y 50/02 2/410 |
| 2015/0250971 A1* | 9/2015 | Bachelder | B33Y 50/00 128/205.25 |
| 2015/0382123 A1 | 12/2015 | Jobani | |
| 2016/0247017 A1* | 8/2016 | Sareen | G06T 7/60 |
| 2016/0349738 A1 | 12/2016 | Sisk | |
| 2017/0004567 A1* | 1/2017 | Dutt | G06Q 30/0643 |
| 2017/0010603 A1 | 1/2017 | Ingleton et al. | |
| 2017/0095014 A1* | 4/2017 | King | A42C 2/007 |
| 2017/0132846 A1* | 5/2017 | Iverson | G06T 15/40 |
| 2017/0157483 A1* | 6/2017 | Wilber | A63B 69/0002 |
| 2017/0351246 A1 | 12/2017 | Colaianni et al. | |
| 2018/0092428 A1* | 4/2018 | Knight | A42C 2/007 |
| 2018/0144237 A1 | 5/2018 | Sareen | |
| 2020/0100554 A1* | 4/2020 | Bologna | A42B 3/046 |

FOREIGN PATENT DOCUMENTS

| | | | | |
|---|---|---|---|---|
| EP | 1923101 A1 * | 5/2008 | ......... | A63B 21/0628 |
| JP | 2005079069 A * | 3/2005 | | |
| WO | WO-2013/058978 A1 | 4/2013 | | |
| WO | WO-2013058978 A1 * | 4/2013 | ............... | A41H 1/02 |
| WO | WO-2014/151324 A1 | 9/2014 | | |
| WO | WO-2014/183157 A1 | 11/2014 | | |
| WO | WO-2014183157 A1 * | 11/2014 | ........... | A61B 5/0022 |
| WO | WO-2015/138242 A1 | 9/2015 | | |
| WO | WO-2017/127887 A1 | 8/2017 | | |
| WO | WO-2017127887 A1 * | 8/2017 | ......... | A61B 17/7059 |
| WO | WO-2017/185452 A1 | 11/2017 | | |
| WO | WO-2017185452 A1 * | 11/2017 | ............... | G06K 9/00 |

OTHER PUBLICATIONS

Billington, "Futuristic F-35 Fighter-Pilot Helmet Technology Hails New Era in Aerial Warfare", International Business Times, Aug. 23, 2016, https://www.ibtimes.co.uk/futuristic-f-35-fighter-pilot-helmet-technology-hails-new-era-aerial-warfare-1577438 (1 page).

Bindahman et al., "3D Body Scanning Technology: Privacy and Ethical Issues", International Conference on Cyber Security, Cyber Warfare and Digital Forensic (CyberSec), (2012), pp. 150-154, http://ieeexplore.ieee.org/stamp/stamp.jsp?tp=&arnumber=6246113&isnumber=6246077.

Bing ru et al., "Automatic Measurement of Scanned Human Body in Fixed Posture," IEEE 11th International Conference on Computer-Aided Industrial Design & Conceptual Design, (2010), pp. 575-578, http://ieeexplore.ieee.org/stamp/stamp.jsp?tp=&arnumber=5681284&isnumber=5681221.

Bougourd et al., "A Comparison of Women's Sizing by 3D Electronic Scanning and Traditional Anthropometry", Journal of the Textile Institute, (2000), vol. 91 No. 2, pp. 163-173, http://www.3dbodyscanning.org/cap/papers2016.html.

Chi et al., "Body Scanning of Dynamic Posture", International Journal of Clothing Science and Technology, (2006), vol. 18 No. 3, pp. 166-178.

Chiu et al., "Effect of Different Standing Poses on Whole Body Volume Acquisition by Three-Dimensional Photonic Scanning", IET Science, Measurement & Technology, (2016) vol. 10, No. 6, pp. 553-556, http://ieeexplore.ieee.org/stamp/stamp.jsp?tp=&arnumber=7553648&isnumber=7553630.

Choi et al., "3D Body Scan Analysis of Dimensional Change in Lower Body Measurements for Active Body Positions", Textile Research Journal, (2011), vol. 81, No. 1, pp. 81-93.

Fang et al., "An Automatic Method for Computerized Head and Facial Anthropometry" Digital Human Modeling, (2011), pp. 12-21.

Fang et al., "Automatic Head and Facial Feature Extraction Based on Geometry Variations", Computer-Aided Design, (2011), vol. 43, pp. 1729-1739.

Geisen et al., "Automatic Detection, Identification, and Registration of Anatomical Landmarks from 3-D Laser Digitizer Body Segment Scans", Proceedings of 17th International Conference of the Engineering in Medicine and Biology Society, (1995), vol. 1, pp. 403-404, http://ieeexplore.ieee.org/stamp/stamp.jsp?tp=&arnumber=575171&isnumber=12495.

Gill et al., "Not All Body Scanning Measurements Are Valid: Perspectives from Pattern Practice", 3DBODY.TECH 2017—8th International Conference and Exhibition on 3D Body Scanning and Processing Technologies, (2017), pp. 43-52.

Gill et al., "Scan Posture Definition and Hip Girth Measurement: The Impact on Clothing Design and Body Scanning", (2019), (24 pages).

(56) References Cited

OTHER PUBLICATIONS

Gill et al., "The True Height of the Waist: Explorations of Automated Body Scanner Waist Definitions of the TC2 Scanner", 5th International Conference and Exhibition on 3D Body Scanning Technologies, (2014), pp. 55-65.

Gill et al., "3D Body Scanning: Towards Shared Protocols for Data Collection", IWAMA 2016: 6th International Workshop of Advanced Manufacturing and Automation, (2016), pp. 281-284.

Gill, "A Review of Research and Innovation in Garment Sizing, Prototyping and Pitting", Textile Progress, (2015), vol. 47 No. 1, (86 pages).

Jeon et al., "An Ergonomic Design of Flight Suit Pattern According to Wearing Characteristics", Proceedings of the Human Factors and Ergonomics Society Annual Meeting, (2011), pp. 1654-1657.

Jones et al., Customized Rapid Manufactured Parts: Technology and Case Studies from the Custom—Fit Project, (2009), pp. 662-672.

Keefe et al., "NATO Research Task Group: 3D Scanning for Clothing Fit and Logistics", Proceedings of 3DBODY.TECH 2017—8th International Conference on 3D Body Scanning and Processing Technologies, Oct. 11-12, 2017, pp. 201-209.

Kuang-Rong et al., "An Expert System for Special Body Shapes Recognition in Apparel Made-to-Measure", International Conference on Measuring Technology and Mechatronics Automation, (2010), pp. 475-478 http://ieeexplore.ieee.org/stamp/stamp.jsp?tp=&arnumber=5459854&isnumber=5458485.

Lee et al., "3D Scan to Product Design: Methods, Techniques, and Cases", Sixth International Conference on 3D Body Scanning Technologies, Oct. 27-28, 2015, pp. 168-174.

Lee et al., A 3D Anthropometric Sizing Analysis System Based on North American Caesar 3D Scan Data for Design of Head Wearable Products, Computers & Industrial Engineering, (2018), vol. 117, pp. 121-130.

Lee et al., "Development of Headforms and Anthropometric Sizing Analysis System for Head-Related Product Designs", Proceedings of the Human Factors and Ergonomics Society 59th Annual Meeting, (2015), pp. 1419-1422.

Lee et al., "Ergonomic Design and Evaluation of a Pilot Oxygen Mask for Korea Air Force Pilots", 5th International Conference on 3D Body Scanning Technologies, Oct. 21-22, 2014, pp. 84-92.

Li et al., "Using 3D Body Scans for Shaping Effects Testing Developed by Foundation Garment," The Eighth International Conference on Electronic Measurement and Instruments, (2007), pp. 4-951-4-954, http://ieeexplore.ieee.org/stamp/stamp.jsp?tp=&arnumber=4351302&isnumber=4350397.

Li, "3D Body scan line point cloud processing," 2010 The 2nd Conference on Environmental Science and Information Application Technology, Wuhan, 2010, pp. 333-336. URL: http://ieeexplore.ieee.org/stamp/stamp.jsp?tp=&arnumber=5568331&isnumber=5567446.

Liu et al. "Rapid Preliminary Helmet Shell Design Based on Three-dimensional Anthropometric Head Data", Journal of Engineering Design, (2008), vol. 19, No. 1, pp. 45-54.

Lockheed Martin, "Lockheed Martin Meets 2018 F-35 Production Target with 91 Aircraft Deliveries", Dec. 20, 2018, retrieved on Apr. 7, 2020, https://www.f35.com/news/detail/lockheed-martin-meets-2018-f-35-production-target-with-91-aircraft-deliveries, (12 pages).

Lu et al., "The Evaluation of Scan-Derived Anthropometric Measurements", IEEE Transactions on Instrumentation and Measurement, Aug. 2010, vol. 59, No. 8, pp. 2048-2054, http://ieeexplore.ieee.org/stamp/stamp.jsp?tp=&arnumber=5482190&isnumber=5508591.

McCoppin et al., "The Effects of Clothing on Gender Classification Using LIDAR Data", IEEE National Aerospace and Electronics Conference (NAECON), (2012), pp. 134-139, http://ieeexplore.ieee.org/stamp/stamp.jsp?tp=&arnumber=6531043&isnumber=6531004.

McDonald et al., "IEEE Industry Connections (IEEE-IC) Landmarks and Measurement Standards Comparison in 3D Body-model Processing", IEEE Standards Association, (2018), http://ieeexplore.ieee.org/stamp/stamp.jsp?tp=&arnumber=8362828&isnumber=8362827, (34 pages).

McKinnon et al., "Body Scanning: The Effects of Subject Respiration and Foot Positioning on the Data Integrity of Scanned Measurements", Journal of Fashion Marketing and Management, (2002), vol. 6 No. 2, pp. 103-121.

Miller, "Outfitting F-35 Pilots Requires Perfection" United States Air Force, Oct. 20, 2015, retrieved from https://www.luke.af.mil/ (3 pages).

Nahavandi et al., "A Low Cost Anthropometric Body Scanning System Using Depth Cameras," 2018 IEEE International Conference on Systems, Man, and Cybernetics (SMC), (2018), pp. 3486-3491, http://ieeexplore.ieee.org/stamp/stamp.jsp?tp=&arnumber=8616587&isnumber=8615655.

Niu et al., "Multi-Resolution Description of Three-dimensional Anthropometric Data for Design Simplification", Applied Ergonomics, (2009), vol. 40, pp. 807-810.

Non-Final Office Action on U.S. Appl. No. 16/840,795 dated Mar. 28, 2022 (22 pages).

North Atlantic Treaty Organization (NATO) & Science and Technology Organization (STO), "3D Scanning for Clothing Fit and Logistics (TR-HFM-266)", Mar. 2020, retrieved from https://www.sto.nato.int/.

Ober et al., "Training and Feature-Reduction Techniques for Human Identification Using Anthropometry", Fourth IEEE International Conference on Biometrics: Theory, Applications and Systems (BTAS), (2010), http://ieeexplore.ieee.org/stamp/stamp.jsp?tp=&arnumber=5634519&isnumber=5634461 (8 pages).

Paquet et al., "Adjustment of Virtual Mannequins Through Anthropometric Measurements, Cluster Analysis, and Content-Based Retrieval of 3-D Body Scans", IEEE Transactions on Instrumentation and Measurement, Oct. 2007, vol. 56, No. 5, pp. 1924-1929, http://ieeexplore.ieee.org/stamp/stamp.jsp?tp=&arnumber=4303432&isnumber=4303372.

Parker et al., "3D Body Scanning has Suitable Reliability: An Anthropometric Investigation for Garment Construction", Proceedings of 3DBODY.TECH 2017—8th International Conference and Exhibition on 3D Body Scanning and Processing Technologies, Oct. 11-12, 2017, pp. 298-305, https://pdfs.semanticscholar.org/27d2/ad96e4f68440f9b7c2b032e7ffaf5b52a45c.pdf.

Qu et al., "Boolean Operations of Triangulated Solids and Their Applications in the 3D Geological Modeling", School of Earth and Space Science, Peking University, Beijing (2010), (6 pages).

Simmons et al., "Body Measurement Techniques: Comparing 3D Body-Scanning and Anthropometric Methods for Apparel Applications", Journal of Fashion Marketing and Management: An International Journal, (2003), vol. 7 No. 3, pp. 306-332.

Skorkovska et al., "A Simple and Robust Approach to Computation of Meshes Intersection," Proceedings of the 13th International Joint Conference on Computer Vision, Imaging and Computer Graphics Theory and Applications, (2018), vol. 1, pp. 175-182.

Stewart et al., "Variability in body size and shape of UK offshore workers: A cluster analysis approach", Applied Ergonomics, (2017), vol. 58 No. 1, pp. 265-272.

Thong et al., "3D Printing—Revolutionising Military Operations", Pointer: Journal of the Singapore Armed Forces, Nov. 24, 2016, vol. 42, No. 2, pp. 35-46.

Tomkinson et al., "Body Size Changes of Royal Australian Air Force Aircrew: 1971-2005", Aug. 2009, retrieved from https://apps.dtic.mil/docs/citations/ADA510222, (34 pages).

Treleaven et al., "3D Body Scanning and Healthcare Applications", Computer (published by the IEEE Computer Society), Jul. 2007, pp. 28-34, http://ieeexplore.ieee.org/stamp/stamp.jsp?tp=&arnumber=4287239&isnumber=4287226.

Tsoli et al., "Model-Based Anthropometry: Predicting Measurements from 3D Human Scans in Multiple Poses", IEEE Winter Conference on Applications of Computer Vision, (2014), pp. 83-90, http://ieeexplore.ieee.org/stamp/stamp.jsp?tp=&arnumber=6836115&isnumber=6835728.

Wan et al., "Anthropometric Techniques based on Kinect 3D Scanning", International Conference on Mechatronic Sciences, Elec-

(56) References Cited

OTHER PUBLICATIONS tric Engineering and Computer (MEC), (2013), pp. 1292-1296, http://ieeexplore.ieee.org/stamp/stamp.jsp?tp=&arnumber=6885266&isnumber=6885035.

Weiss et al., "Home 3D Body Scans From Noisy Image and Range Data", International Conference on Computer Vision, (2011), http://ieeexplore.ieee.org/stamp/stamp.jsp?tp=&arnumber=6126465&isnumber=6126217, pp. 1951-1958.

Werghi et al., "A Functional-Based Segmentation of Human Body Scans in Arbitrary Postures", IEEE Transactions on Systems, Man, and Cybernetics, Part B (Cybernetics), Feb. 2006, vol. 36, No. 1, pp. 153-165, http://ieeexplore.ieee.org/stamp/stamp.jsp?tp=&arnumber=1580626&isnumber=33385.

Werghi, "Segmentation and Modeling of Full Human Body Shape From 3-D Scan Data: A Survey," IEEE Transactions on Systems, Man, and Cybernetics, Part C (Applications and Reviews), Nov. 2007, vol. 37, No. 6, pp. 1122-1136, http://ieeexplore.ieee.org/stamp/stamp.jsp?tp=&arnumber=4344000&isnumber=4343957.

Whitestone et al., "Development of a Portable Torso Scanning System to Capture Encumbered Soldier Fit", 2018 Safe Symposium Technical Program, Oct. 2018, (3 pages).

Wu, "A 3D Method for Fit Assessment of a Sizing System", Digital Human Modeling, (2009), pp. 737-743.

Xia et al., "A Method of Extracting Human Facial Feature Points Based on 3D Laser Scanning Point Cloud Data", 23rd International Conference on Geoinformatics, (2015), http://ieeexplore.ieee.org/stamp/stamp.jsp?tp=&arnumber=7378673&isnumber=7378547 (3 pages).

Xiaojie, "3D Body Scan Line Point Cloud Processing", The 2nd Conference on Environmental Science and Information Application Technology, (2010), pp. 333-336, http://ieeexplore.ieee.org/stamp/stamp.jsp?tp=&arnumber=5568331&isnumber=5567446.

Zhang et al., "An Example-Based Anthropometric Model for Face Shape Synthesis", IEEE International Conference on Multimedia and Expo, (2008), pp. 1573-1576, http://ieeexplore.ieee.org/stamp/stamp.jsp?tp=&arnumber=4607749&isnumber=4607348.

Zhang et al., "Data-Driven Feature-Based 3D Face Synthesis", Sixth International Conference on 3-D Digital Imaging and Modeling (2007), pp. 39-46, http://ieeexplore.ieee.org/stamp/stamp.jsp?tp=&arnumber=4296737&isnumber=4296726.

Zhong et al., "3D Human Body Morphing Based on Shape Interpolation", First International Conference on Information Science and Engineering, (2009), pp. 1027-1030, http://ieeexplore.ieee.org/stamp/stamp.jsp?tp=&arnumber=5455323&isnumber=5454428.

Zou et al., "Body Measurement Technique based on Chinese Characteristic", Ninth International Conference on Computer-Aided Industrial Design and Conceptual Design, (2008), pp. 228-231, http://ieeexplore.ieee.org/stamp/stamp.jsp?tp=&arnumber=4730558&isnumber=4730505.

Notice of Allowance on U.S. Appl. No. 16/840,795 dated Jul. 21, 2022 (9 pages).

\* cited by examiner

| Pilot Flight Equipment | Selection |
|---|---|
| Communication, Video, and Data Cables | ☐ |
| Visor(s) | ☐ |
| Oxygen Mask | ☐ |
| Oxygen Hose | ☐ |
| Helmet Assembly | ☐ |
| Helmet Liner(s) | ☐ |

FIG. 4

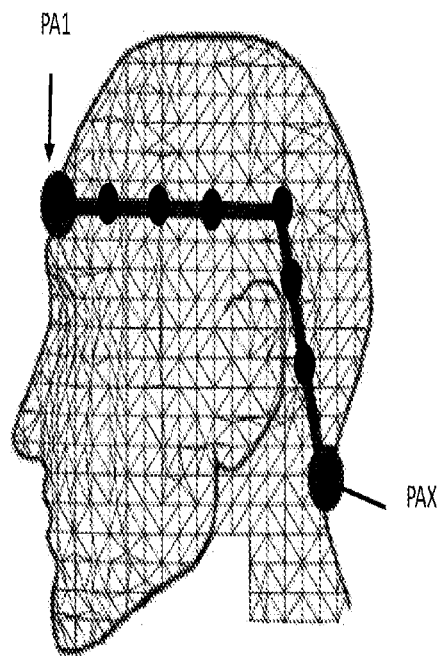
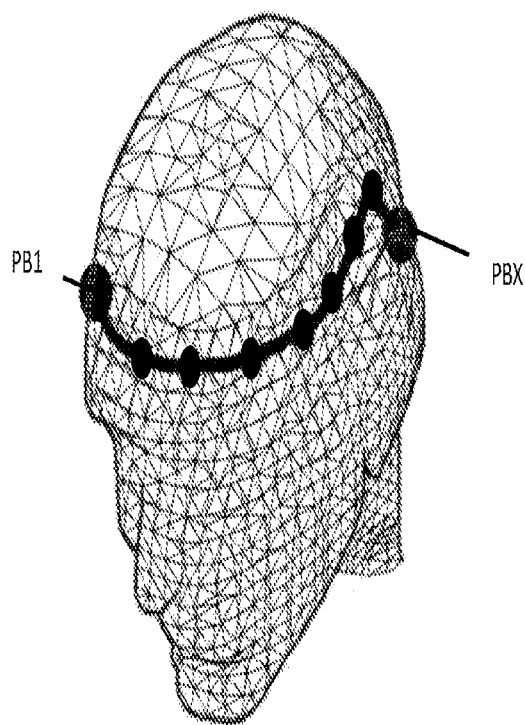
FIG. 8A
FIG. 8B

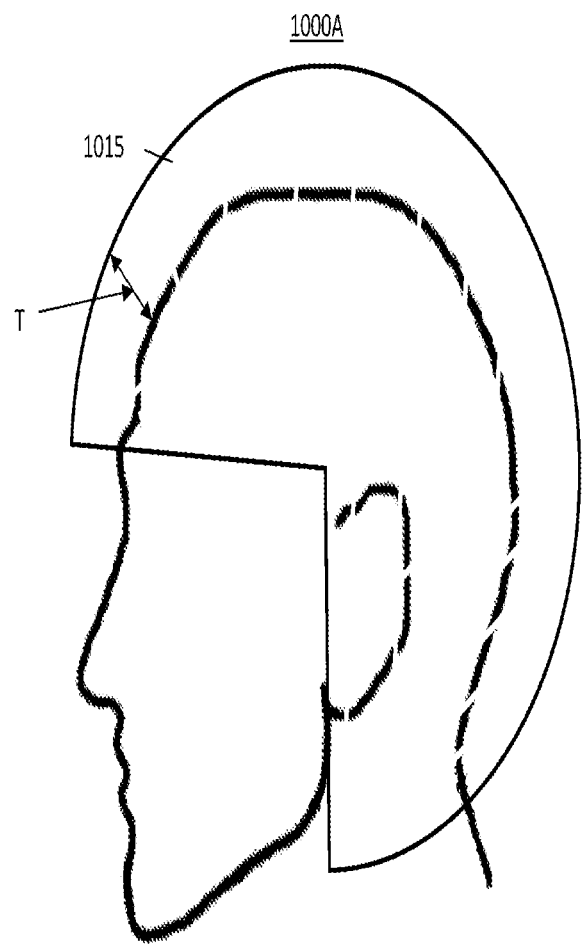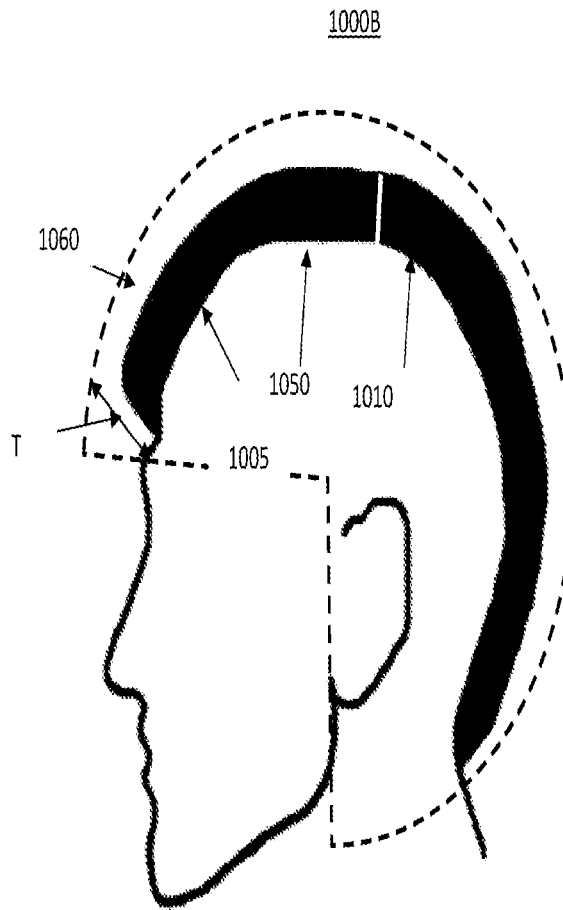
FIG. 10A
FIG. 10B

1200

| Flight Suit Garments | Selection |
|---|---|
| Full Coverage Lower G-force Garment | ☐ |
| Flight Jacket, Sleeveless | ☐ |
| Lightweight Coverall | ☐ |
| Flight Jacket, Sleeved | ☐ |
| Cold Water Immersion Garment | ☐ |
| Cold Water Immersion Garment Socks | ☐ |
| Arm Restraint Extension Lines | ☐ |
| Cooling Garment | ☐ |
| Skeletal Lower G-force Garment | ☐ |
| Thermal Protective Layer | ☐ |

1202 — Full Coverage Lower G-force Garment
1204 — Flight Jacket, Sleeveless
1206 — Lightweight Coverall
1208 — Flight Jacket, Sleeved
1210 — Cold Water Immersion Garment
1212 — Cold Water Immersion Garment Socks
1214 — Arm Restraint Extension Lines
1216 — Cooling Garment
1218 — Skeletal Lower G-force Garment
1220 — Thermal Protective Layer

FIG. 12       1240

SYSTEM AND METHOD FOR THREE-DIMENSIONAL (3D) COMPUTER-AIDED MANUFACTURING (CAM) OF AN ENSEMBLE OF PILOT EQUIPMENT AND GARMENTS

CROSS-REFERENCE TO RELATED APPLICATIONS

This application is a continuation of U.S. patent application Ser. No. 16/840,795, filed Apr. 6, 2020, the contents of which are incorporated herein in their entirety by reference.

BACKGROUND

Embodiments relate to a system and method for three-dimensional (3D) computer-aided manufacturing (CAM) of an ensemble of equipment and garments for soldiers and airmen.

Extracting tailoring measurements or anthropometric data from 3D scans is seeing rapid adoption in retail for applications such as virtual try-on, custom clothing, and online sizing.

Meanwhile, military applications, have not seen widespread adoption and would benefit greatly from these improved systems. Complex military systems have low error tolerances and commonly require "perfection" to fit wearable equipment, but rely heavily upon manual tailor measurements, standard size rolls, and disjointed systems; resulting in a fit process that is labor and time intensive, subject to error.

SUMMARY

Embodiments relate to a system and method for three-dimensional (3D) computer-aided manufacturing (CAM) of an ensemble of equipment and garments for soldiers and airmen. A system comprising a scanner to scan the airman or soldier (subject), including at least the head of the subject; and a computing device having at least one processor and tangible, non-transitory computer readable medium having program instructions which when executed to cause at least one processor to: receive, from the scanner, digital three-dimensional (3D) digital surface model (DSM) scan data representative of the surface of the subject in a computational geometry format. The at least one processor further to: recognize anatomical features on the 3D surface model including the cephalic (head) region of the scanned subject; store each sub region defined by anatomical features as a non-manifold 3D surface model; create a surface offset from the DSM sub region; create a closed volume within and between the DSM sub region and the offset surface representative of a solid 3D pilot flight equipment; and cause a computer-aided manufacturing (CAM) device to manufacture the solid 3D pilot flight equipment based on the formed digital data representative of the solid 3D pilot flight equipment.

A method comprising: receiving, from a scanner device, a digital three-dimensional (3D) digital surface model (DSM) scan data representative of the surface of the subject in a computational geometry format. The at least one processor further to: recognize anatomical features on the 3D surface model including the cephalic (head) region of the scanned subject; store each sub region defined by anatomical features as a non-manifold 3D surface model; create a surface offset from the DSM sub region; create a closed volume within and between the DSM sub region and the offset surface representative of a solid 3D pilot flight equipment; and cause a computer-aided manufacturing (CAM) device to manufacture the solid 3D pilot flight equipment based on the formed digital data representative of the solid 3D pilot flight equipment.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 4 illustrates a graphical user interface for selecting pilot flight equipment;

FIG. 8A illustrates a boundary for a helmet liner on the side view of the head and face of FIG. 7A;

FIG. 8B illustrates a boundary for a helmet liner on the perspective view of the head and face of FIG. 7B;

FIG. 10A illustrates a hidden line view of the helmet on a subject;

FIG. 10B illustrates a section-view of the helmet and helmet liner layers;

FIG. 12 illustrates a graphical user interface for selecting flight suit garments;

DETAILED DESCRIPTION

Figure 1:
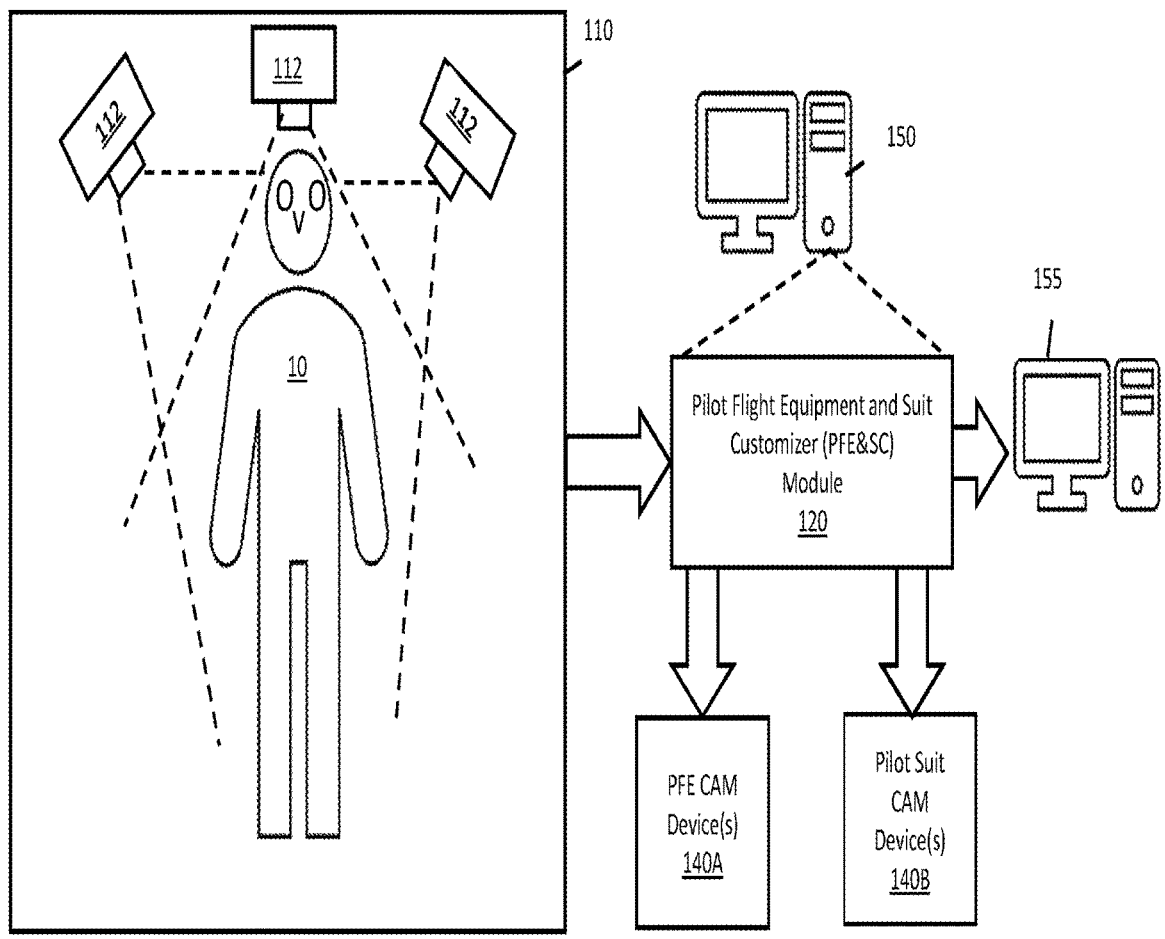
FIG. 1 illustrates a block diagram of a system for three-dimensional (3D) computer-aided manufacturing (CAM) of pilot flight equipment and/or flight suit.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1 illustrates a block diagram of a system 100 for three-dimensional (3D) computer-aided manufacturing (CAM) of pilot flight equipment (PFE) and/or pilot garments. The system 100 may comprise a digital scanner 110 configured to scan the anatomy or anatomy part of a subject 10. The system 100 may include a pilot flight equipment and suit customizer (PFE&SC) module 120. The PFE&SC module 120 may be a computer program product stored on tangible and non-transitory computer readable medium, the computer program product when executed cause the generation of pilot flight equipment and/or suit. The pilot flight equipment (PFE) may be made of a homogeneous material, in some embodiments. By way of non-limiting example, the homogeneous material may be a chemical mixture which is configured to be used in an additive manufacturing process. For example, the homogeneous material may be a polyurethane resin, such as for protective helmet lining and padding. Parts of the PFE may be made of non-homogeneous materials or multiple homogeneous material sections integrated into a single part.

The PFE&SC module 120 may include program instructions stored in a computer readable medium which when executed to cause the at least one processor of computing device 150 to: receive, from the scanner, digital three-dimensional (3D) surface model scan data representative of the anatomy or anatomy part of a subject 110. The scan data may be in a stereolithography (STL), OBJ, a point cloud format, or similar computational geometry format. The processor of the PFE&SC module 120 systematically studies the scan data from the scanner to determine key features and uses these features to create non-manifold regions of interest along the surface of the scanned subject. By way of a non-limiting example, a region of interest is the face of the subject, particularly the region encompassing the mouth and nose for use in designing a custom pilot's oxygen mask. The scan data's computational geometry for these non-manifold surface regions of interest may be thickened to create a closed volume (solid 3D model). The processor of the PFE&SC module 120 may cause computer-aided manufacturing (CAM) device to manufacture a solid 3D pilot flight equipment device from the solid 3D model. For example, the PFE may be a helmet liner based on the formed data representative of the solid 3D model. Further, the PFE&SC module 120 may cause the CAM device to manufacture flight suit garments.

The scanned data may be used to develop measurement values for various sub regions such as the neck and arm to determine a neck size and arm length for use in defining interconnecting cables worn on, or attached to, the subject or pilot suit. Still further, the measurement values are used by the processor to select the nearest fit from available sizes for each article of the subject's garment and supply recommended alterations. Other sub regions may include the face, for making a custom oxygen mask (landmark points visible in FIGS. 7A, 7B and 11), and the brow, crown, nape, and ear for making custom helmet liners (shown in FIGS. 7A to 10B) that match the contour of the head and regions of the torso and legs for making custom body armor.

The system 100 may include a computer-aided manufacturing (CAM) machine 140A configured, by computer aid, to manufacture a three-dimensional (3D) custom pilot flight equipment. By way of a non-limiting example, this pilot flight equipment may be a custom helmet protective liner(s). In some embodiments, the liners may be constructed of different materials, which are layered to improve performance.

In some embodiments, the system 100 may include a pilot suit CAM device(s) 140B. Each CAM device may be dedicated for a 3D printing operation of a particular component of the ensemble. For example, CAM device 140B may be used for printing articles of the pilot's flight suit, like a close-fitting thermal protective layer.

The digital scanner 110 may use digital scanning technology configured to collect thousands to millions of data points to make a digital map of the subject or part of the anatomy of a subject. The digital scanner 110 may be configured to scan and create a digital model of a subject's one-of-a-kind head. The digital scanner 110 may be a peripheral device interfaced with the computing device 150. In some embodiments, the digital scanner 110 may be remote from the computing device 150 and include its own processor and program code instructions. Digital scanner 110 may employ non-contact sensor technology of one of: infrared, optical, structured light, or laser.

By way of non-limiting example, the digital scanner 110 may include a plurality of scanning devices 112 with integral sensors. The sensors may be one of infrared, optical, structured light, or laser device. The scanner 110 may be a non-contact system. The scanning may have a scan time of <10 seconds.

The computing device 150 may communicate with a remote computing device 155 such as for tailoring certain pilot equipment and garments based on the scan of the subject.

Figure 2A:
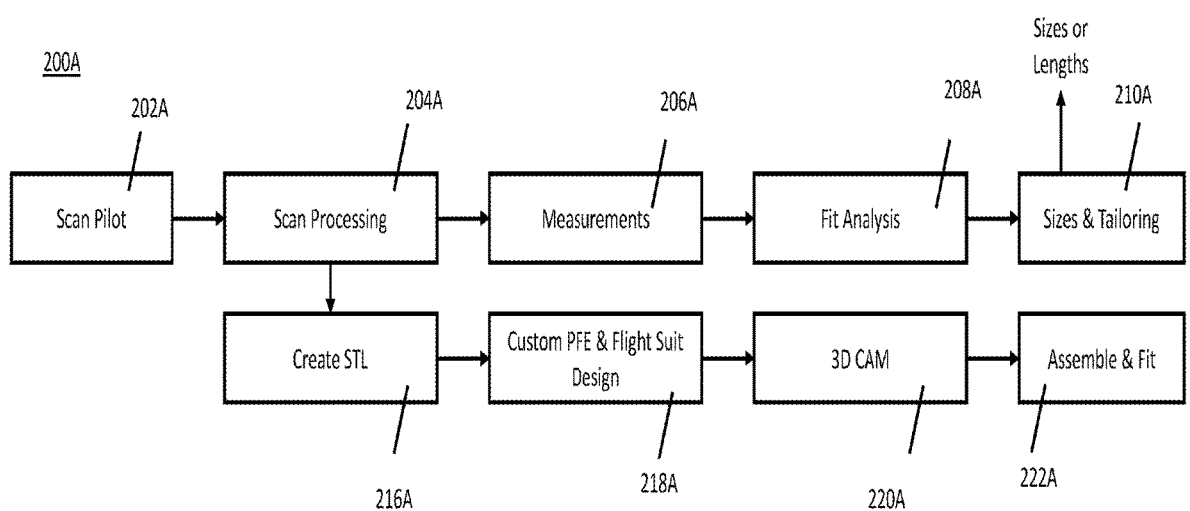
FIG. 2A illustrates a flow diagram of a method for customized pilot flight equipment (PFE) for a flight suit ensemble.
Figure 2B:
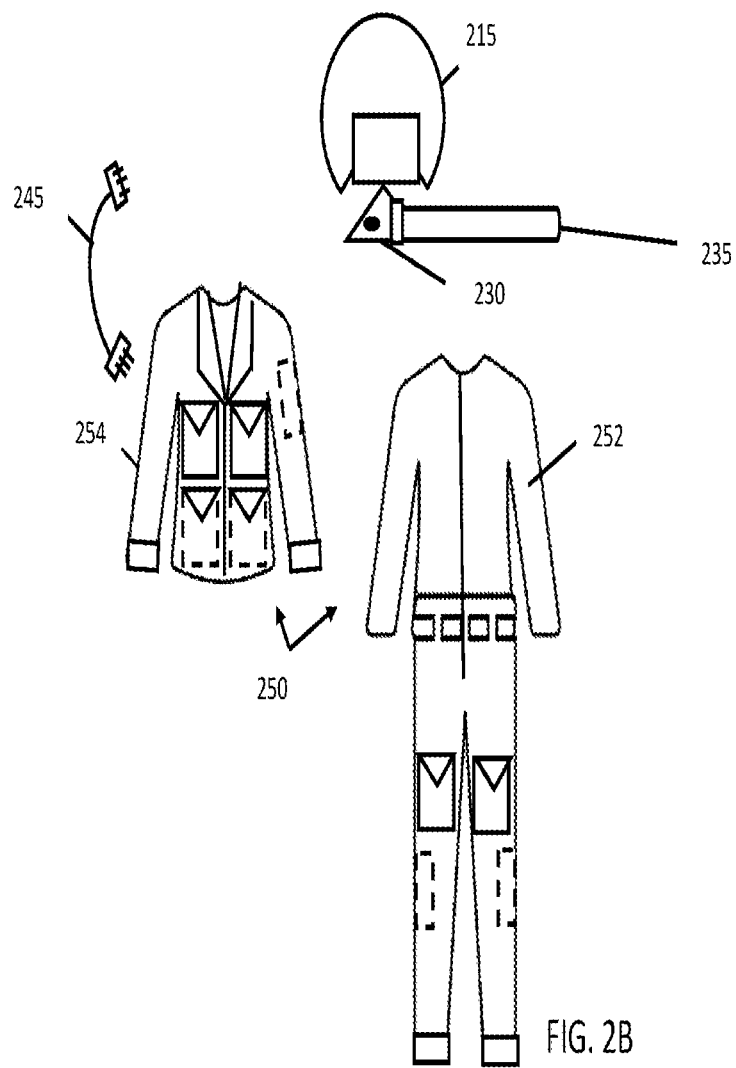
FIG. 2B illustrates a flight suit ensemble with PFE.

FIG. 2A illustrates a flow diagram of a method 200A for customized pilot flight equipment (PFE) and flight suit ensemble, as shown in FIG. 2B. The method 200A may include scanning the pilot, at block 202A; and processing the scanned data points of the scanned data file, at block 204A. At block 206A, the method may include determining PFE measurements based on the data points for customizing lengths and sizes of standard, non-custom, garments and equipment. For example, the measurement may be useful in defining the length for an electronics or communications cable or the oxygen hose. Further, the measurements may be useful in determining the flight jacket size for the pilot from standard sizes; by way of a non-limiting example, standard sizes may include small, medium, large, and extra-large.

The method 200A may include, at block 208A, conducting a fit analysis using the measurements collected, at block 206A, against the non-custom flight suit garments and pilot flight equipment. The results of the fit analysis, at block 208A may be used for sizing and tailoring, at block 210A. The method 200A may print the size, length of interconnecting cables, and routine tailor alterations (e.g., hemming to a printed inseam length) based on the measurements obtained, at block 206A, and fit analysis performed, at block 208A.

The method 200A when customizing the ensemble may manufacture certain articles such as, without limitation, helmet liner(s), protective clothing, and oxygen mask. The method 200A may include creating at least one standard triangle language (STL) file, at block 216A, for use in designing these custom PFE and flight suit articles. For example, each of the helmet liner(s) may require an STL file of the brow and crown regions of the scanned subject's head or cephalic. The oxygen mask may require its own STL file of the front of the subject's face including mouth, nose, check bones, etc.

The method 200A, at block 218A, may include designing the pilot flight equipment (PFE) and flight suit based on the corresponding STL file. The oxygen mask would be customized based on the subject's face, the breathing supply source hose, and the helmet's interconnecting requirements. The helmet's liner(s) would be customized and optimized based on the helmet size, the helmet type, and the head of the subject.

The method 200A, at block 220A, may perform computer-aided manufacturing (CAM) of the custom PFE and flight suit articles. By way of non-limiting example, the CAM of the PFE would include manufacturing the helmet liner(s), close-fitting thermal protective layer, and/or oxygen mask. The CAM may include 3D printing. The method 200A, at block 222A, may include assembly and fit of the manufactured articles. For example, the helmet liner(s) would be affixed to the interior of the helmet; exhalation valve(s), supply hose, and hardware would be affixed to the oxygen mask.

In some embodiments, the CAM oxygen mask would include fastener points to affix connectors to the mask wherein the connectors are used to connect the mask to the helmet. However, the PFE whether trimmed to size from a standard size or additively manufactured from the scan data would be made-to-fit the pilot based on the scanned pilot.

FIG. 2B illustrates a flight suit ensemble with PFE. The PFE may include helmet 215 which may be available in a plurality of sizes. By way of non-limiting example, helmets 215 may be available as small, medium and large. The measurements such as the size of the cranium of the subject may be used to determine the size of the helmet from which to begin patterning of the liners.

The oxygen mask 230 may be customized for the facial features of the subject relative to the helmet, as will be described in more detail. The oxygen mask hose 235 may be customized, in length, based on the subject's anatomy. The oxygen mask hose 235 may be a function of measurements such as length of the torso so that the pilot can receive the oxygen gas from the oxygen gas source, cockpit size, and seat location so that the hose 235 may reach the oxygen gas source.

The interconnecting cable 245 may be customized based on the scan of the subject. The cable 245 may be a function of measurements such as length of the torso, cockpit size, and seat location so that the cable 245 can transmit communications, video, or other critical data from the pilot's flight equipment to the aircraft.

The flight suit 250 may include at least a coverall 252 as an outer layer and a flight jacket 254. Other layers may be under the coverall and thus not shown in this illustration.

Measurements from the scan data may be defined by the International Organization of Standardization (ISO), for example. The ISO standardized measurement may be used for sizing standards. Examples of ISO standards include ISO 8559-1:2017, Size Designation of Clothes Part 1; ISO 8559-2:2017, Size Designation of Clothes Part 2; and ISO 8559-2:2018, Size Designation of Clothes Part 3: Methodology for the creation of measurement table and intervals. Various standards for common materials used in the finished product(s) include MIL-C-83141A, MIL-V-43511, MIL-C-83409, MIL-W-4088/PIA-W-4088—Nylon Webbing, MIL-DTL-5038K (Mil-T-5038)/PIA-T-5038—Nylon Tape, MIL-T-87130—Kevlar Tape/Webbing, MIL-W-5625/PIA-W-5625—Nylon Tubular, MIL-T-5608/PIA-T-5608-Nylon Parachute Tape, MIL-T-6134C—Nylon Parachute Tape, MIL-W-17337—Nylon Webbing, MIL-W-27657B—Nylon Webbing, MIL-W-43668C—Textured Nylon Webbing, MIL-W-43685B—Nomex Tape, MIL-T-43709B—Nomex Tape, and MIL-W-87127—Kevlar Tape. The term "MIL" as used herein stands for U.S. military standards.

Other standards include ISO 7250-1:2017, Basic human body measurements for technological design—Part 1: Body measurement definitions and landmarks; and ISO 20685-1: 2018 3D scanning methodologies for internationally compatible anthropometric databases—Part 1: Evaluation protocol for body dimensions extracted from 3-D body scans.

Figure 3A:
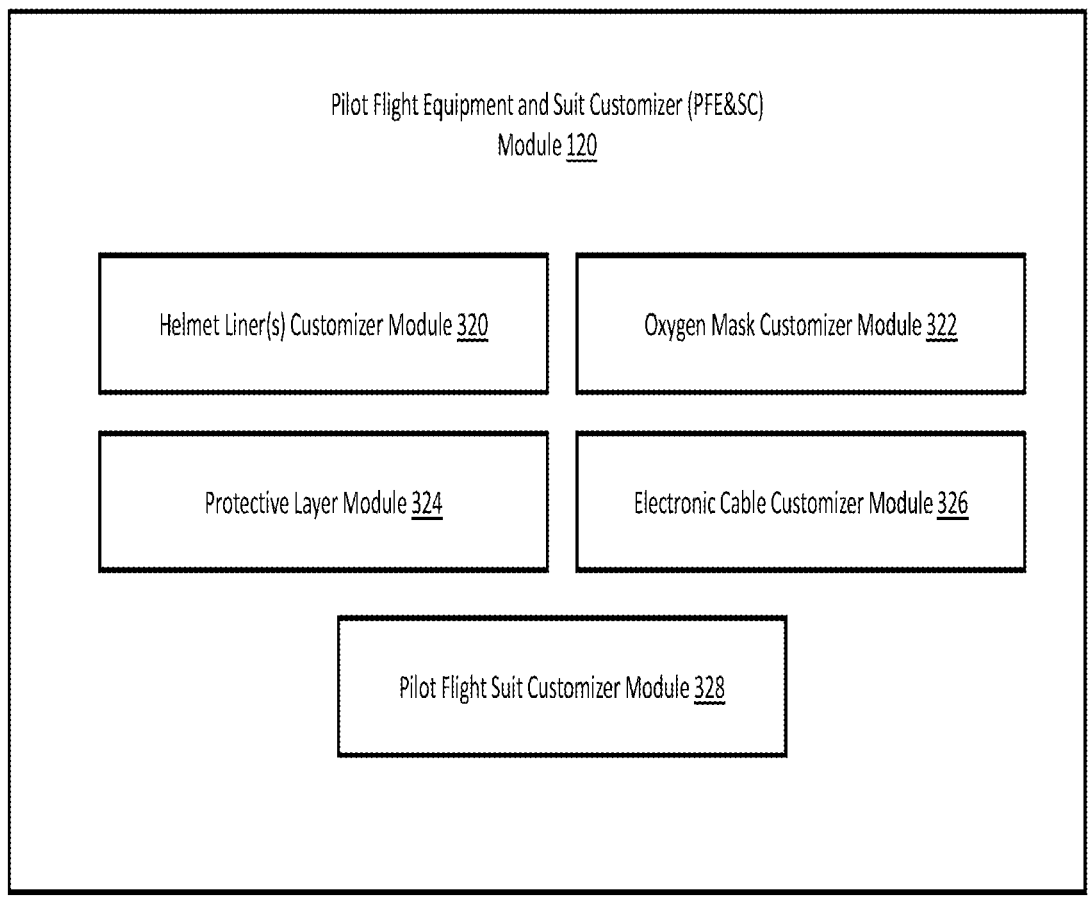
FIG. 3A illustrates a system architecture of the pilot flight equipment and suit customizer (PFE&SC) module.

FIG. 3A illustrates a block diagram of the pilot flight equipment and suit customizer (PFE&SC) module 120. The PFE&SC module 120 may include a helmet liner(s) customizer module 320 and/or an oxygen mask customizer module 322. The PFE&SC module 120 may include a protective layer module 324. The PFE&SC module 120 may include an electronic cable customizer module 326. The PFE&SC module 120 may include a pilot flight suit customizer module 328.

Figure 3B:
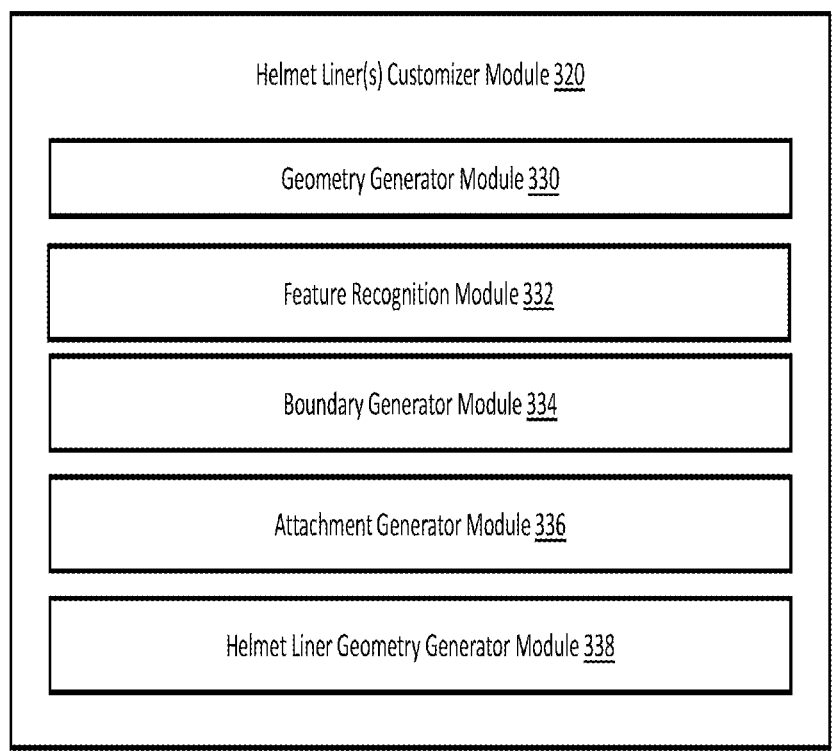
FIG. 3B illustrates the Helmet Liner(s) Customizer Module.

FIG. 3B illustrates a block diagram of the helmet liner(s) customizer module 320. The operation of the helmet liner(s) customizer module 320 will be described in relation to FIG. 3B in combination with FIGS. 6, 7A, 7B, 8A, 8B and 9.

Figure 7A:
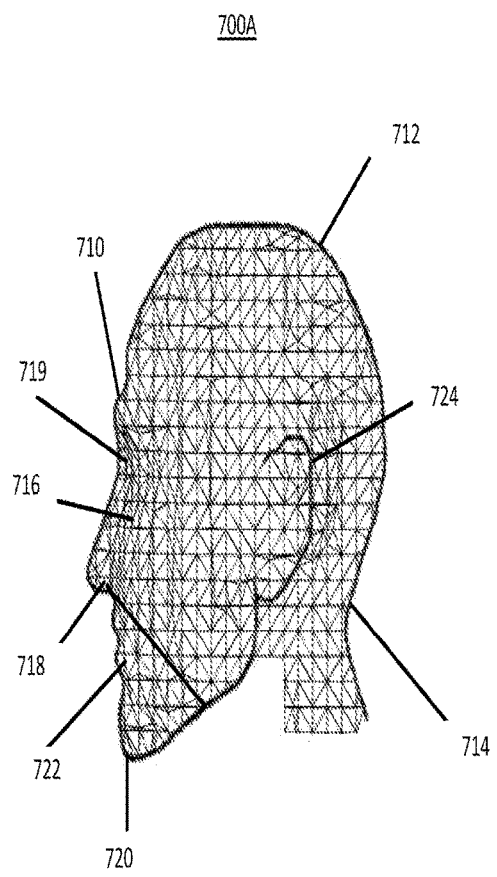
FIG. 7A illustrates a representative mesh of a side view of a three-dimensional head and face of a subject.
Figure 7B:
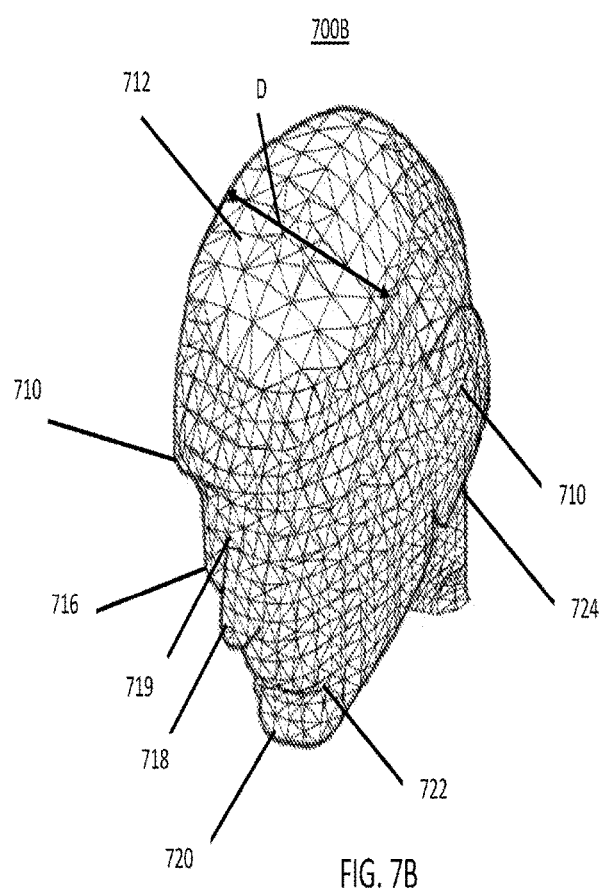
FIG. 7B illustrates a representative mesh of an isometric perspective view of the three-dimensional head and face of the subject.

In FIGS. 7A and 7B, triangulated mesh of vertices is generated by the geometry generator module 330. By way of a non-limiting example, the scanners may use an iterative closest point algorithm to match the points detected by each sensor. This results in a mapped 3D geometry point cloud of the subject's surfaces exposed to the sensors of the scanning devices 112. From here, various meshing algorithms may be used to create a manifold surface from the scanned pilot. For example, a Delaunay Triangulation method may be used on all the points (vertices) to join them together into a mesh. This mesh, typically stored in a Stereolithography (STL) format, is generated in module 330.

Figure 6:
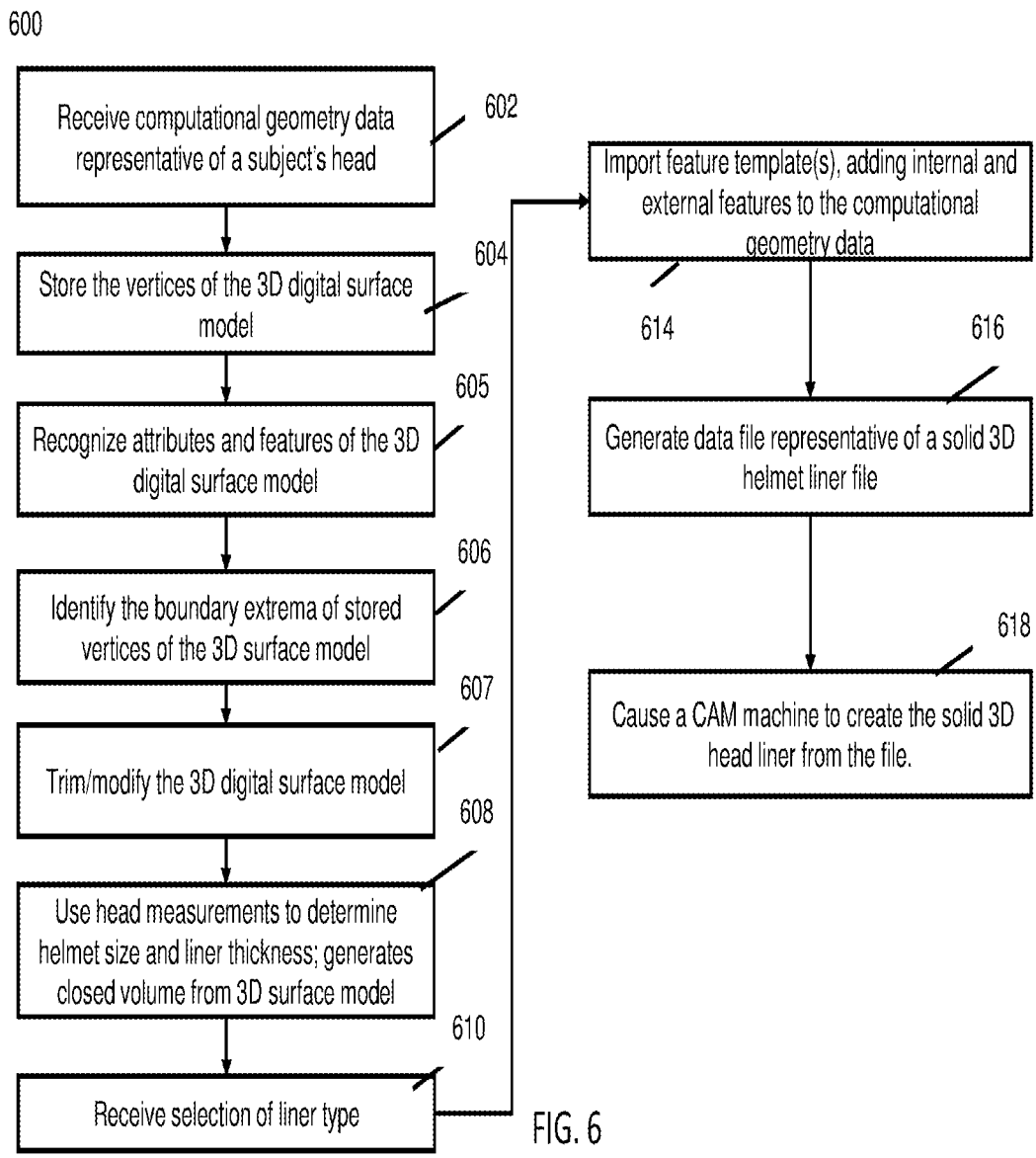
FIG. 6 illustrates a flowchart of a method for manufacturing a made-to-fit helmet liner.

FIG. 6 illustrates a flowchart of a process for manufacturing a made-to-fit helmet liner. The blocks of the process 600 may be performed in the order shown or a different order. One or more of the blocks may be performed contemporaneously. The module may include additional blocks and some blocks may be deleted or skipped.

The process 600 may include, at block 605, recognizing attributes and/or features, by the feature recognition module 332. In the case of the helmet liner customizer module 320, the features may include the ear 724, brow 710, nape 714, and other anatomical features of the head shown in FIGS.

7A and 7B. These are used to section off a region of the manifold surface generated in module 330. As shown in FIGS. 8A and 8B, the edges or boundaries denoted by the reference numerals PA1-PAX and PB1-PBX are in close proximity to the features identified in FIGS. 7A and 7B, at block 605.

The method 600 may include, at block 606, identifying the boundary extrema point vertices (i.e., points PA1-PAX) of the 3D surface model, by the boundary locator module 332. The identifying, at block 606, may be performed by the customizer module 320. The method 600 may determine the extrema boundary, at block 606, which become the free edge of a new non-manifold 3D digital model surface after trimming at block 607. This new surface is a sub-region representing an area of the pilot's head that will be in contact with the finished helmet liner; this is a sub-region of the STL generated in geometry generator module 330. The steps in block 605 thru block 608, in other embodiments, may not occur in the sequence shown in FIG. 6. With the lower surface of the liner defined, at block 606, and stored as a new STL at block 607, measurements from the scan data may be used to determine the helmet size, at block 608. The helmet size can be used to select a helmet candidate based on a fit analysis of the head dimensions or measurements with the known dimensions of an off-the-shelf helmet candidate. The liner thickness may also be determined at block 608. A closed volume of the liner from the 3D surface model may be generated at block 608.

Assume that the head has a circular profile which can be measured to determine a diameter. The diameter D of the crown 712 may be used to determine the size of the helmet, for example. FIG. 7B illustrates a representative mesh 700B of isometric view of the three-dimensional head and face of the subject with diameter D. Some embodiments may also use circumference to select the helmet size from among the standard sizes available for a given aircraft. By way of a non-limiting example, the aircraft system also has defined requirements for the location of the pilot's head within the helmet so that the electronics are properly aligned in operation. These requirements allow the alignment of the selected helmet size to the scanned pilot as shown in FIG. 10A.

FIG. 10A illustrates a helmet outline 1015 overlaid on a cranium of a subject's scanned image representation. Assume for the purposes of discussion FIG. 10A illustrates a determined helmet size suitable to fit the head of the subject. The helmet size accommodates a helmet liner(s) of thicknesses T. FIG. 10B illustrates a section-view of the helmet liner(s) of thickness T. Layer 1060 represents space for an outermost liner which may be supplied to fit the helmet size selected before assembling in custom layers. The layer denoted by reference numerals 1005 and 1010 represents a custom brow and a custom crown, respectively. An innermost liner 1050 in contact with the pilot's head is also shown. This thickness of the custom brow 1005 and custom crown 1010 may be applied to the liner sub-region surface to create a solid volume 3D model with inner surface contact the scanned pilot and outer surface contacting the helmet.

Referring again to FIG. 3B, the helmet liner customizer module 320 may include a boundary generator module 334. The boundary generator module 334 may determine the contour of the helmet candidate for determining the helmet liners such as the first helmet liner 500A and/or the second helmet liner 500B. The helmet liner customizer module 320 may include attachment generator module 336. The attachments at block 614 may be designed to interface the interior surface of the helmet shell to the helmet liner(s). The helmet interfaces are well known in the art and vary per helmet type.

In some embodiments, a helmet liner covering only the brow may be separate from the helmet liner covering the crown such that together they form a complete helmet liner layer which is configured to be in direct contact with the pilot's head. Another liner layer, 1060 (FIG. 10B), may be configured to interface between the helmet inner surface and the brow and crown liner(s). In some embodiments the brow and crown liner portions may be integrated into a single liner. These are defined in block 610 and affect boundary module 334. The finished 3D liner model may then be sent to a CAM for manufacturing. At block 614, feature templates are imported, and internal and/or external features are added to the liners. In other words, the computational geometry is updated with the added internal and/or external features. The helmet liner customizer module 320 may include helmet liner geometry generator module 338. At block 616, a data file is generated representative of a solid (closed volume) 3D helmet liner in the form of the helmet liner geometry. At block 618, the CAM machine is caused to create a solid 3D helmet line from the file.

FIG. 8A illustrates a point boundary for a helmet liner on the side view of the head and face of FIG. 7A. FIG. 8B illustrates a point boundary for a helmet liner on the perspective view of the head and face of FIG. 7B. The lower extrema points PA1-PAX are shown in FIG. 8A. Similarly, the extrema points for this helmet liner region are shown on FIG. 8B as PB1-PBX. Not all boundary points are shown to prevent crowding of the drawing. FIGS. 8A and 8B include selected point based on cranial features of the mesh of FIG. 7A.

FIG. 4 illustrates a representative graphical user interface (GUI) menu 400 for selecting pilot flight equipment (PFE). The graphical user interface (GUI) menu 400 may allow a user to select which PFE is needed by the pilot as part of the PFE&SC 120. The menu and options available, along with the output from each, are custom to the aircraft supported by this system. The GUI 400 may allow the user to select the communication, video, and data cables on row 402. For example, this selection may result in a specified assembly length and cable routing after processing the scan of the subject. The row 404 may allow the user to select the visor(s). The output of this selection, in some embodiments, may be a 3D model file of the required visor if not a printed visor from a CAM device. The row 406 may allow the user to select an oxygen mask. In some embodiments, this may be the selection of a standard size, or it may be a fully custom 3D printed oxygen mask based on one or more of the user's nose size, bridge of the nose, chin, lips, and cheek bones. The row 408 may allow the user to select an oxygen hose. Similar to the electronic cables 402, this may result in a specified assembly length and hose routing after processing the scan of the subject. The length of the oxygen hose may be based on the measured distance from the oxygen mask to the oxygen supply source. The row 410 may allow the user to select the helmet assembly. The output of this selection may be an entirely 3D printed custom helmet, or it may result in a specified size from the standard helmet sizes available. The row 412 may allow the user to select the helmet protective liner(s). This may be a single helmet liner, or multiple, as required by the helmet design and PFE assembly process.

Figure 5A:
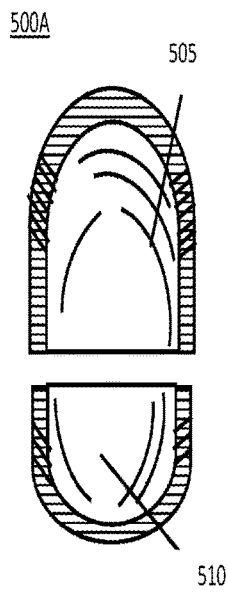
FIG. 5A illustrates first helmet liner.

FIG. 5A illustrates a first helmet liner 500A having liner parts 505 and 510. Specifically, liner part 505 may be for the crown while liner part 510 may be for the brow. In this view, the crown liner part 505 and brow liner part 510 are shown separate liners. In lieu of a seam, the liners may also be integrated. As will be readily seen based on the description herein, the liner parts 505 and 510 are customized for the subject's cranial features relative to a candidate helmet from a plurality of helmets. The first helmet liner 500A may be configured as an energy liner having a certain thickness that fits within the helmet.

Figure 5B:
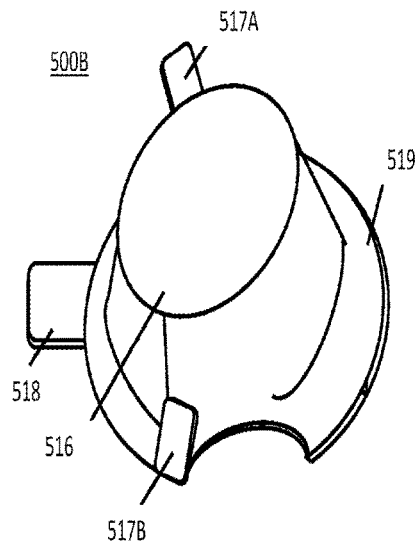
FIG. 5B illustrates a second helmet liner.

FIG. 5B illustrates a second helmet liner 500B. The second helmet liner 500B may be a comfort liner. The second helmet liner 500B may include a liner tabs 517A and 517B. The second helmet liner 500B includes liner body 516. The second helmet liner 500B may include an anti-ruck tab 518. The liner body 516 may include a brim 519. For example, the helmet may include comfort liner retaining clips (not shown) to secure the liner 500B via the liner tabs 517A. The comfort liner 500B may include other custom features and contours based on helmet features. The placement of the tabs 517A and 517B may be determined based on the helmet candidate. Likewise, other custom features such as the anti-ruck tab 518 may be designed and dimensioned based on the helmet candidate.

Figure 5C:
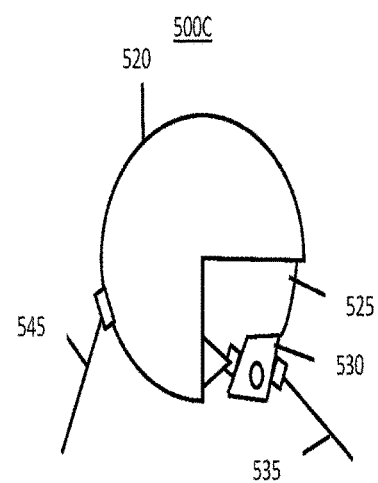
FIG. 5C illustrates a side view of a pilot helmet with visor and oxygen mask.

FIG. 5C, illustrates a side view 500C, of a pilot helmet 520 with visor 525 and oxygen mask 530. The helmets 520 may be available in a plurality of sizes. By way of non-limiting example, helmets may be available as small, medium, large and extra-large. The oxygen mask 530 may be customized for the facial features of the subject relative to the helmet, as will be described in more detail. The oxygen mask hose 535 may be customized based on the subject's anatomy. The oxygen mask hose 535 may be a function of measurements obtained in block 206A of FIG. 2A.

Figures 9, 11:
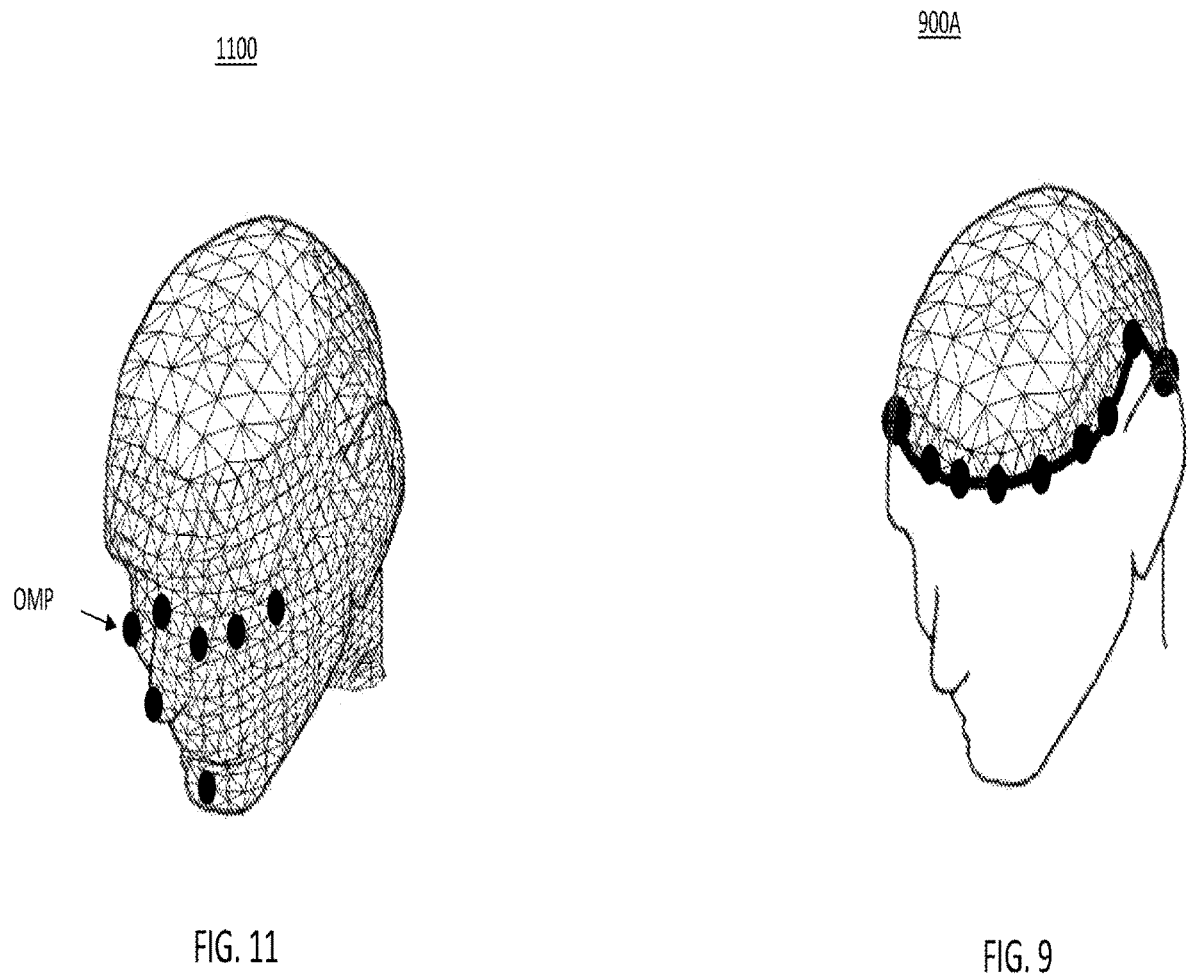
FIG. 9 illustrates a first mesh of the head of the subject for a helmet liner.
FIG. 11 illustrates a first mesh with oxygen mask landmark points depicted for generating an oxygen mask.

FIG. 11 illustrates a mesh 1100 with oxygen mask landmark points (OMLP) depicted for generating an oxygen mask 530 (FIG. 5B). By way of non-limiting example, these landmarks may include cheek bones 716, face width, chin 720, nose 718 and nose bridge 719. The face features may also include the mouth/lips 722. These features may be used to develop a pattern for the oxygen mask 530. A side view of the finished oxygen mask design relative to the face is shown in FIG. 5C. The mask 3D model would be generated in a similar manner as the helmet liners. The mesh sub-region (not shown) of the oxygen mask would be generated such that extrema boundary points would be mapped using these OMLP. Additionally, fasteners and other features (e.g., breathing hose attachment, exhalation valve) of the oxygen mask 530 would be generated and included in the 3D digital model according to the aircraft's requirements. The oxygen mask may require connectors for attachment to the helmet candidate. Thus, the oxygen mask pattern would include any connector points, loops, or other means to fasten, strap or attach the mask to the helmet candidate.

FIG. 12 illustrates a graphical user interface (GUI) 1200 for selecting below the neck pilot flight equipment and suit. On row 1202, the user may select a full coverage lower G-force garment. On row 1204, the user may select a sleeveless flight jacket. On row 1206, the user may select a coverall such as a lightweight coverall. On row 1208, the user may select a sleeved flight jacket. On row 1210, the user may select a cold-water immersion garment. On row 1212, the user may select cold-water immersion garment socks. On row 1214, the user may select an arm restraint extension lines. On row 1216, the user may select a cooling garment. On row 1218, the user may select a skeletal lower G garment. On row 1220, the user may select a thermal protective layer.

The selection boxes 1240 may be used to individually select the garments of choice and particularly the garment layers. Based on the selected boxes 1240, the pilot flight garment customizer module 330 may produce one or more customized patterns based on the outer PFG layers. The pilot flight garment customizer module 330 may produce one or more customized patterns of inner layers of the PFG relative to the adjacent layers of garments and the thickness of the materials used to manufacture the garment.

Computational Hardware Overview

Figure 13:
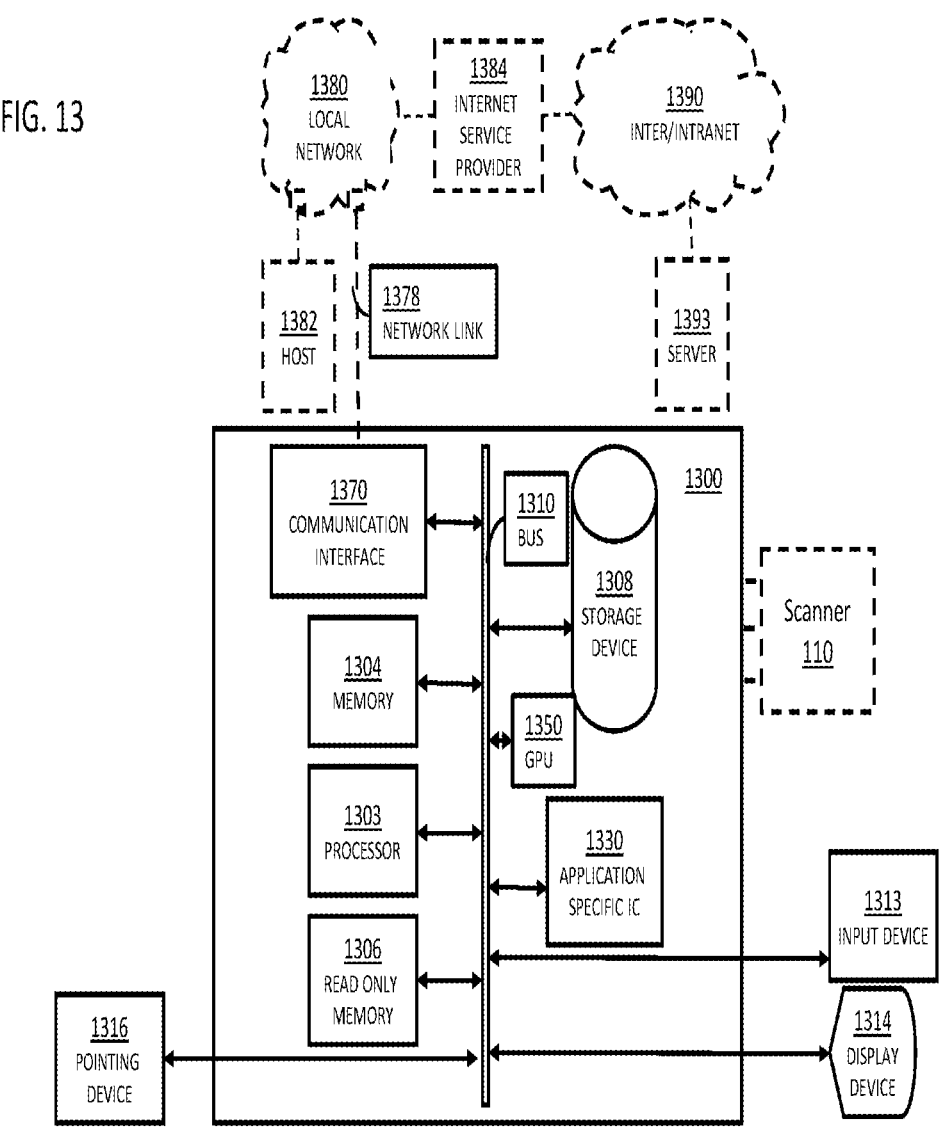
FIG. 13 illustrates a special purposes computer system.

FIG. 13 is a block diagram that illustrates a computer system 1300 (i.e., computing device 150) upon which an embodiment may be implemented or employed. The terms computing system and computer system are used interchangeably herein. Computer system 1300 includes a communication mechanism such as a bus 1310 for passing information between other internal and external components of the computer system 1300. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more blocks of one or more methods described herein. Thus, the computer system is a special purpose computer system.

A sequence of binary digits constitutes digital data that is used to represent a number or code for a character. A bus 1310 includes many parallel conductors of information so that information is transferred quickly among devices coupled to the bus 1310. One or more processors 1303 for processing information are coupled with the bus 1310. A processor 1303 performs a set of operations on information. The set of operations include bringing information in from the bus 1310 and placing information on the bus 1310. The set of operations also typically include comparing two or more units of information, shifting positions of units of information, and combining two or more units of information, such as by addition or multiplication. A sequence of operations to be executed by the processor 1303 constitutes computer instructions. A graphics processing unit (GPU) 1350 may be coupled to bus 1310.

Computer system 1300 also includes a memory 1304 coupled to bus 1310. The memory 1304, such as a random access memory (RAM) or other dynamic storage device, stores information including computer instructions. The memory 1304 may also include dynamic memory which allows information stored therein to be changed by the computer system 1300. RAM allows a unit of information stored at a location called a memory address to be stored and retrieved independently of information at neighboring addresses. The memory 1304 is also used by the processor 1303 to store temporary values during execution of computer instructions. The computer system 1300 also includes a read only memory (ROM) 1306, non-volatile persistent storage device or static storage device coupled to the bus 1310 for storing static information, including instructions, that is not changed by the computer system 1300. The ROM 1306 may be a secure byte-addressable memory (storage) device or a direct-access for files (DAX) memory device. The bus 1310 may also have coupled thereto other storage devices including a non-volatile (persistent) storage device, such as a magnetic disk or optical disk, for storing information, including instructions, that persists even when the computer system 1300 is turned off or otherwise loses power.

Information, including instructions, is provided to the bus 1310 for use by the processor from an external input device 1313, such as a keyboard containing alphanumeric keys operated by a human user, or a sensor. A sensor detects conditions in its vicinity and transforms those detections into signals compatible with the signals used to represent information in computer system 1300. Other external devices coupled to bus 1310, used primarily for interacting with humans, include a display device 1314, such as a cathode ray tube (CRT) or a liquid crystal display (LCD), light emitting diode (LED) displays, for presenting images, and a pointing device 1316, such as a mouse or a trackball or cursor direction keys, for controlling a position of a small cursor image presented on the display device 1314 and issuing commands associated with graphical elements presented on the display 1314. The processor may be coupled to peripheral devices, such as the CAM device 140A or 140B, using peripheral drivers. The processor is configured to perform one or more blocks of the method of FIG. 6 and part of the customizer module 320.

In the illustrated embodiment, special purpose hardware, such as an application specific integrated circuit (IC) 1330, may be coupled to bus 1310. The special purpose hardware may be configured to perform operations not performed by processor 1303 quickly enough for special purposes. Examples of application specific ICs include graphics accelerator cards for generating images for display device 1314, cryptographic boards for encrypting and decrypting messages sent over a network, speech recognition, and interfaces to special external devices, such as robotic arms and scanning equipment that repeatedly perform some complex sequence of operations that are more efficiently implemented in hardware.

Computer system 1300 also includes one or more instances of a communications interface 1370 coupled to bus 1310. Communication interface 1370 provides a two-way communication coupling to a variety of external devices that operate with their own processors, such as printers, scanners and external disks.

The communication interface 1370 may receive images from a digital scanner 110. Pointing device 1316, input device 1313 and display device 1314 may be associated with host computer 1382.

In general, the computer system 1300 through the communication interface 1370 may be coupled with a network link 1378 that is connected to a local network 1380 to which a variety of external devices with their own processors are connected. In some embodiments, the local network 1380 may be a private network and may include wired and/or wireless communications. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 may be a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1370 sends and receives electrical, acoustic or electromagnetic signals, including infrared and optical signals, that carry information streams, such as digital data.

The term computer-readable medium is used herein to refer to any medium that participates in providing information to processor 1303, including instructions for execution. Such a medium may take many forms, including, but not limited to, non-volatile media, volatile media and transmission media. Non-volatile media include, for example, optical or magnetic disks, such as storage device. Volatile media include, for example, dynamic memory 1304. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1303, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1303, except for carrier waves and other signals.

Logic encoded in one or more tangible media includes one or both of processor instructions on a computer-readable storage media and special purpose hardware, such as ASIC 1330. Network link 1378 typically provides information communication through one or more networks to other devices that use or process the information. For example, network link 1378 may provide a connection through a private or local network 1380 to a host computer 1382, such as a secure host computer. For example, in some embodiments, the pilot may be located at the host computer 1382. Thus, the user interfaces referenced in FIG. 13, may be located with the host computer 1382.

In some embodiments, the computer system 1300 may connect to equipment 1384 operated by an Internet Service Provider (ISP) or Intranet Service Provider. ISP equipment 1384 in turn provides data communication services through the public, world-wide packet-switching communication network of networks now commonly referred to as the Internet 1390 or alternately over an Intranet. A computer called a server 1393 connected to the Internet or Intranet provides a service in response to information received over the Internet or Intranet. For example, server 1393 provides information representing video data for presentation at display 1314 or the server may receive information representing video data.

The embodiments related to the use of computer system 1300 for implementing the techniques described herein. According to one embodiment, those techniques are performed by computer system 1300 in response to processor 1303 executing one or more sequences of one or more instructions contained in memory 1304 to form a computer program product. Such instructions, also called software and program code, may be read into memory 1304 from another computer-readable medium such as storage device 1308. Execution of the sequences of instructions contained in memory 1304 causes processor 1303 to perform one or more of the method blocks described herein. In alternative embodiments, hardware, such as application specific integrated circuit 1330, may be used in place of or in combination with software to implement the embodiments. Thus, embodiments are not limited to any specific combination of hardware and software.

Computer program code for carrying out operations described above may be written in a variety of programming languages, including but not limited to a high-level programming language, such as without limitation, C or C++, for development convenience. In addition, computer program code for carrying out operations of embodiments described herein may also be written in other programming languages, such as, but not limited to, interpreted languages. The program code may include hardware description language (HDL) or very high speed integrated circuit (VHSIC) hardware description language, such as for firmware programming. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a non-transitory, tangible computer-readable storage medium such as a magnetic tape, a flexible disc, a hard disc, a compact disc, a photo-magnetic disc, a digital versatile disc (DVD) or the like.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server 1392 transmits program code for a particular application, requested by a message sent from computer 1300, through Internet 1390, ISP equipment 1384, local network 1380 and communications interface 1370. The received code may be executed by processor 1303 as it is received or may be stored in storage device 1308 or other non-volatile storage for later execution, or both. In this manner, computer system 1300 may obtain application program code in the form of a signal on a carrier wave.

Various forms of computer readable media may be involved in carrying one or more sequence of instructions or data or both to processor 1303 for execution. For example, instructions and data may initially be carried on a magnetic disk of a remote computer such as host computer 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red a carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1303 retrieves and executes the instructions using some of the data sent with the instructions. The instructions and data received in memory 1304 may optionally be stored on storage device 1308, either before or after execution by the processor 1303.

The memory 1304 may have stored thereon applications implemented as software or computer instructions. The applications when executed by the processor 1303 may perform one or more functions and steps as described herein.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:

1. A system comprising:
   a scanner to scan a subject; and
   a computer having at least one processor and tangible, non-transitory computer readable medium having program instructions which when executed to cause the at least one processor to:
   receive, from the scanner, digital three-dimensional (3D) digital surface model (DSM) scan data representative of the surface of the subject in a computational geometry format;
   recognize anatomical features on the 3D digital surface;
   create a closed volume within and between a DSM sub region and a surface offset from the DSM sub region, the closed volume being representative of a solid 3D pilot flight equipment;
   read and store body measurement data from the DSM scan data;
   use the body measurement data to define at least one of length, marking, or retention details for the connecting cables that are attached to the subject during flight operations, the connecting cables comprising at least one of communication, video, or data cables configured to transmit data from flight equipment to an aircraft; and
   cause a computer-aided manufacturing (CAM) device to manufacture the solid 3D pilot flight equipment based on the formed digital data representative of the solid 3D pilot flight equipment.

2. The system of claim 1, wherein the at least one processor is configured to create the surface offset from the sub region, and wherein creating the surface offset from the sub region comprises defining a thickness of the solid 3D pilot flight equipment.

3. The system of claim 1, wherein creating the closed volume comprises integrating, by the at least one processor, internal and external features in the formed digital data representative of the solid 3D pilot flight equipment.

4. The system of claim 1, wherein the at least one processor is further configured to:
   determine, based on a user selection, a type of solid 3D pilot flight equipment; and
   responsive to the determination, automatically select a design of the solid 3D pilot flight equipment.

5. The system of claim 4, wherein the user selection includes at least one of a pilot's helmet liner, a breathing mask, or body armor.

6. The system of claim 1, wherein the CAM device is a 3D printer.

7. The system of claim 1, wherein the at least one processor is further configured to prescribe alterations to prescribed garment sizes based on the body measurement data responsive to a comparison of a computed fit of the prescribed garment sizes to the body measurement data.

8. A system comprising:
   a scanner to scan a subject; and
   a computer having at least one processor and tangible, non-transitory computer readable medium having program instructions which when executed to cause the at least one processor to:
   receive, from the scanner, digital three-dimensional (3D) digital surface model (DSM) scan data representative of the surface of the subject in a computational geometry format;
   receive an input corresponding to a type of the solid 3D pilot flight equipment;
   recognize anatomical features on the 3D digital surface based on the type of the solid 3D pilot flight equipment;
   create a closed volume within and between a DSM sub region and a surface offset from the DSM sub region, the closed volume being representative of a solid 3D pilot flight equipment;
   prescribe alterations to prescribed garment sizes for the subject based on body measurement data responsive to a comparison of a computed fit of the prescribed garment sizes to the body measurement data, wherein the body measurement data is determined from the DSM scan data; and
   cause a computer-aided manufacturing (CAM) device to manufacture the solid 3D pilot flight equipment based on the formed digital data representative of the solid 3D pilot flight equipment.

9. The system of claim 8, wherein the at least one processor is further configured to store the DSM sub region, the DSM sub region being defined by the anatomical features as a non-manifold 3D surface model.

10. The system of claim 8, wherein the type of 3D pilot flight equipment is a helmet liner and wherein the recognized anatomical features include an ear, a brow, and a nape.

11. The system of claim 8, wherein the type of 3D pilot flight equipment is an oxygen mask and wherein the recognized anatomical features include a face width, a chin, a nose, and cheek bones.

12. The system of claim 8, wherein the type of 3D pilot flight equipment is body armor and wherein the recognized anatomical features include a head contour and one or more regions of a torso and legs.

13. A method comprising:
   receiving, from a scanner, digital three-dimensional (3D) digital surface model (DSM) scan data representative of the surface of a subject in a computational geometry format;
   recognizing one or more anatomical features on the 3D surface model;
   creating a closed volume within and between a DSM sub region and an offset surface representative of a solid 3D pilot flight equipment;
   reading and storing body measurement data from the DSM scan data;

defining, based on the body measurement data from the DSM scan data, length, marking, and retention details for the interconnecting cables that are attached to the subject during flight operations, the interconnecting cables comprising at least one of communication, video, or data cables being configured to transmit data from flight equipment to an aircraft; and causing a computer-aided manufacturing (CAM) device to manufacture the solid 3D pilot flight equipment based on the formed digital data representative of the solid 3D pilot flight equipment.

14. The method of claim 13, further comprising:
determining, based on a user input, a type of the solid 3D pilot flight equipment type; and
responsive to the determination, automatically selecting a design of the solid 3D pilot flight equipment.

15. The method of claim 13, wherein during the creating of the offset surface from the sub region, at least one processor further to define the thickness of the solid 3D pilot flight equipment.

16. The method of claim 13, wherein the user input comprises at least one of a pilot's helmet liner, a breathing mask, or a protective body armor layer.

17. The method of claim 13, further comprising:
printing the formed digital data representative of the solid 3D pilot flight equipment, wherein the CAM device is a 3D printer.

18. The method of claim 13, further comprising prescribing a size associated with the solid 3D pilot flight equipment based on the body measurement data.

19. The method of claim 18, further comprising:
prescribing one or more alterations to the size associated with the solid 3D pilot flight equipment based on a comparison of the prescribed size to the body measurement data.

20. The method of claim 13, wherein the interconnecting cables are further defined based on at least one of a cockpit seat size or a seat location.

* * * * *